(12) United States Patent
Galmiche

(10) Patent No.: US 9,450,470 B2
(45) Date of Patent: Sep. 20, 2016

(54) ELECTRIC MACHINE HAVING TWO ROTORS AND AT LEAST TWO BEARINGS

(71) Applicant: GE Energy Power Conversion Technology Ltd., Rugby, Warwickshire (GB)

(72) Inventor: Christophe Galmiche, Toul (FR)

(73) Assignee: GE Energy Power Conversion Technology, Ltd., Warwickshire (GB)

( * ) Notice: Subject to any disclaimer, the term of this patent is extended or adjusted under 35 U.S.C. 154(b) by 114 days.

(21) Appl. No.: 13/743,708

(22) Filed: Jan. 17, 2013

(65) Prior Publication Data

US 2013/0181560 A1 Jul. 18, 2013

(30) Foreign Application Priority Data

Jan. 17, 2012 (FR) .................... 12 50448

(51) Int. Cl.
*H02K 16/00* (2006.01)
*H02K 7/08* (2006.01)
*H02K 7/09* (2006.01)

(52) U.S. Cl.
CPC ............... *H02K 7/08* (2013.01); *H02K 7/083* (2013.01); *H02K 7/085* (2013.01); *H02K 7/09* (2013.01); *H02K 16/00* (2013.01); *H02K 2213/03* (2013.01)

(58) Field of Classification Search
CPC ........ H02K 7/08; H02K 7/083; H02K 16/00; H02K 16/02
USPC .................... 310/90, 112–114, 262
See application file for complete search history.

(56) References Cited

U.S. PATENT DOCUMENTS

| | | | | |
|---|---|---|---|---|
| 1,960,484 | A | * | 5/1934 | Ekstromer ..................... 310/112 |
| 3,483,410 | A | * | 12/1969 | Lencioni, Jr. .......... H02K 26/00 310/114 |
| 4,435,662 | A | * | 3/1984 | Tawse ..................... H02K 21/24 310/168 |
| 4,644,207 | A | | 2/1987 | Catterfeld et al. |
| 4,684,873 | A | * | 8/1987 | Glennon ......................... 322/47 |
| 5,229,676 | A | * | 7/1993 | Bood ............................. 310/114 |
| 5,709,103 | A | * | 1/1998 | Williams ............... B64D 13/06 244/118.5 |
| 6,917,130 | B2 | * | 7/2005 | Aiello ................... F16C 17/026 310/90 |
| 7,786,638 | B2 | * | 8/2010 | Pulnikov ................. F16C 17/02 310/67 R |
| 2012/0017539 | A1 | | 1/2012 | Neufeld et al. |

FOREIGN PATENT DOCUMENTS

| | | |
|---|---|---|
| DE | 29621850 U1 | 2/1997 |
| DE | 102006038576 A1 | 4/2008 |
| DE | 102008037707 A1 | 2/2010 |
| GB | 783 249 A | 9/1957 |

* cited by examiner

Primary Examiner — Dang Le
(74) Attorney, Agent, or Firm — Wood IP LLC

(57) ABSTRACT

An electric machine is provided. The electric machine includes at least one stator, a shaft, movable in rotation around an axis of rotation, two rotors, each being interdependent of the shaft, at least two bearings, able to support both rotors and the shaft. A single bearing is located between both rotors along the axis of rotation.

12 Claims, 2 Drawing Sheets

ELECTRIC MACHINE HAVING TWO ROTORS AND AT LEAST TWO BEARINGS

Priority is hereby claimed to FR Patent Application No. 12 50448 filed Jan. 17, 2012, the entire document of which is hereby incorporated by reference herein.

BACKGROUND OF THE INVENTION

The present invention relates to an electric machine including at least one stator, a shaft, movable in rotation around an axis of rotation and two distinct rotors, each being interdependent of the shaft at least two bearings, able to support both rotors and the shaft.

Such an electric machine is known, comprising two stators each being intended to generate a rotating field, as well as two rotors, each being associated with a respective stator and able to be set into motion under the effect of the field of the associated stator.

Such an electric machine comprises a shaft movable in rotation around an axis of rotation, both rotors being interdependent of the shaft, and two end bearings supporting the shaft in each of these ends. Both end bearings are positioned, following the axis of rotation, on either side of the assembly of the two rotors.

SUMMARY OF THE INVENTION

However, such an electric machine is not adapted for high rotational speeds, such as speeds of rotation of more than 8,000 revolutions per minute.

An object of the invention may provide an electric machine adapted to high speeds of rotation, while retaining the same bulkiness.

For this purpose, the present invention provides an electric machine comprising at least one stator, a shaft movable in rotation around an axis of rotation, and two distinct rotors, each being interdependent of the shaft. The electric machine further includes at least two bearings able to support both rotors and the shaft, characterized in that a single bearing is laid out between both rotors along the axis of rotation.

According to other advantageous aspects of the invention, the electric machine may include one or several of the following features, taken individually or according to all technically possible combinations:
 the shaft is in the form of a single cylinder, both rotors being interdependent of the single cylinder,
 the shaft comprises two shaft segments, each rotor being interdependent of a respective shaft segment, and both shaft segments are interdependent in rotation around the axis of rotation,
 the shaft comprises three shaft pieces, each rotor being interdependent of two shaft pieces, a shaft piece positioned between both rotors being common to both rotors and the three shaft pieces being interdependent in rotation around the axis of rotation,
 the machine comprises exactly three bearings, two bearings being laid out, along the axis of rotation, on either side of the assembly of the two rotors, and the third bearing being laid out between both rotors along the axis of rotation,
 the machine comprises exactly two bearings, one bearing being laid out in the vicinity of one end of the shaft, and the other bearing being laid out between both rotors along the axis of rotation,
 each bearing includes its own casing,
 each bearing is an element from the group consisting in: a magnetic bearing, an oil bearing, a water bearing, a gas bearing and a roller bearing,
 the machine comprises a single frame, and both rotors are positioned inside the frame,
 the machine has a speed of rotation, around the axis of rotation, of more than 8,000 revolutions per minute, preferably more than 15,000 revolutions per minute, still preferably more than 20,000 revolutions per minute,
 the machine comprises two stators, each being able to drive into rotation a respective rotor, and
 the machine comprises a single stator, the stator being able to drive into rotation both rotors.

BRIEF DESCRIPTION OF THE DRAWINGS

These features and advantages of the invention will become apparent upon reading the description which follows, only given as a non-limiting example, and made with reference to the appended drawings, wherein.

DETAILED DESCRIPTION OF PREFERRED EMBODIMENTS

Figure 1:
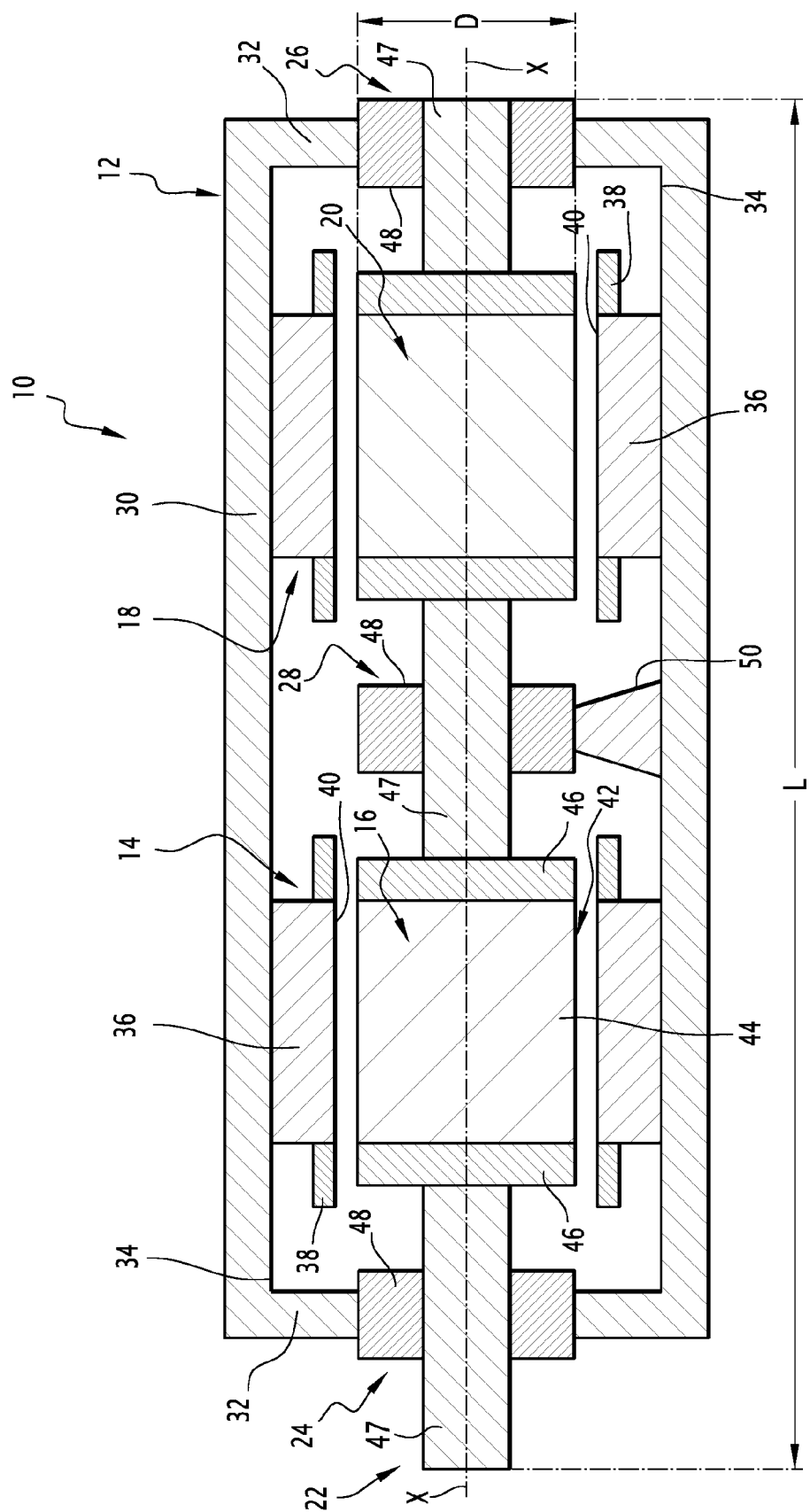
FIG. 1 is a schematic axial sectional view of an electric machine according to a first embodiment of the invention.

The electric machine 10 comprises a frame 12, a first stator 14 and a first rotor 16, as well as a second stator 18 and a second rotor 20. In an alternative, not shown, the electric machine 10 comprises a single stator.

The electric machine 10 comprises a shaft 22, movable in rotation around a longitudinal axis X, also called an axis of rotation, both rotors 16, 20 being interdependent of the shaft 22.

The electric machine 10 also comprises a first bearing 24, a second bearing 26 and a third bearing 28, able to support the shaft 22 and both rotors 16, 20. In the exemplary embodiment of FIG. 1, the electric machine 10 comprises exactly three bearings 24, 26, 28.

The electric machine 10 is for an example an asynchronous machine. Alternatively, the machine 10 is a synchronous machine.

The electric machine 10 has a high rated speed of rotation, such as a speed of more than 8,000 revolutions per minute. The rated speed of rotation is preferably more than 15,000 revolutions per minute, still preferably more than 20,000 revolutions per minute.

The frame 12 comprises a main body 30 with the shape of a hollow cylinder extending along the longitudinal axis X, and two end plates 32. Each end plate 32 obturates an aperture 34 of the main body laid out in a respective end of the hollow cylinder.

The frame 12 bears the first and second stators 14, 18 as well as the first, second and third bearings 24, 26, 28.

Each stator 14, 18 includes a main body 36 and windings 38 maintained in the notches of the main body 36. The main body 36 is in the form of a cylinder of axis X, and has in its center a recess 40 for letting through the corresponding rotor 16, 20, as illustrated in FIG. 1. Each winding 38 is able to generate a rotating field which may drive into rotation the corresponding rotor 16, 20.

Each rotor 16, 20 includes a main body 42 extending along the longitudinal axis X, as well as a rotor winding, not shown, closed on itself, forming a squirrel cage, when the electric machine 10 is an asynchronous machine. The main body 42 comprises a stack 44 of thin metal sheets cooperating with two tightening members 46 with the shape of flanges, positioned on either side of each axial end of this stack 44. Both tightening members 46 are mechanically connected through attachment rods, not shown, the attachment rods extending along the longitudinal axis X and crossing right through the stack of metal sheets 44 along the longitudinal axis X. Additionally, the tightening members 46 are interdependent of the shaft 22.

Alternatively, each rotor 16, 20 is a rotor with permanent magnets, and includes a plurality of magnets attached to the main body 42, when the electric machine 10 is a synchronous machine. The permanent magnets form corresponding magnetic poles.

Each rotor 16, 20 has a diameter D along a radial direction perpendicular to the longitudinal axis X, and the value of the diameter D is substantially identical for both rotors 16, 20. The value of the diameter D is typically comprised between 150 mm and 350 mm.

Both stators 14, 18 and both rotors 16, 20 are positioned inside the frame 12, i.e. inside the hollow cylinder 30.

The shaft 22 is movable in rotation around the longitudinal axis X, and is borne by the bearings 24, 26, 28.

The shaft 22 has a length L along the longitudinal axis X. The length L of the shaft 22 is typically comprised between 1,500 mm and 3,000 mm.

In the exemplary embodiment of FIG. 1, the shaft 22 includes three shaft pieces 47, a shaft piece 47 being positioned between both rotors 16, 20 and the two other shaft pieces 47 being positioned on either side of both rotors 16, 20 along the longitudinal axis X. The three shaft pieces 47 are attached to the corresponding tightening members 46. Alternatively, the tightening members 46 are made with the corresponding shaft pieces 47 in the same material. The shaft piece 47 positioned between both rotors 16, 20 and both corresponding tightening members 46 then only form a single part.

In an alternative not shown, the shaft 22 comprises two distinct shaft segments, each rotor 16, 20 being interdependent of a respective shaft segment. The shaft 22 preferably comprises exactly two distinct shaft segments. Each shaft segment crosses the corresponding rotor 16, 20 right through along the axis X, and the two shaft segments are interdependent in rotation around the axis of rotation X, in the absence of any flexible coupling between them.

In an alternative not shown, the shaft 22 is in the form of a single cylinder, and is made in one piece.

The first and second bearings 24, 26, also called end bearings, are laid out on either side of the assembly of both rotors 16, 20 along the longitudinal axis X. According to the invention, a single bearing, i.e. the third bearing 28, also called an intermediate bearing, is laid out between both rotors 16, 20 along the longitudinal axis X, forming an axis of rotation of the rotors.

Each bearing 25, 26, 28 includes its own casing 48.

The bearing 24, 26, 28 is for example a magnetic bearing. Alternatively, the bearing 24, 26, 28 is an oil bearing, or a water bearing or a gas bearing or further a roller bearing.

The first and second bearings 24, 26 are preferably of a type distinct from the third bearing 28. The first and second bearings 24, 26 are for example magnetic bearings, and the third bearing 28 is an oil bearing. Alternatively, the first and second bearings 24, 26 are for example oil bearings, and the third bearing 28 is a magnetic bearing.

Alternatively, the first, second and third bearings 24, 26, 28 are all of the same type. The first, second and third bearings 24, 26, 28 are for example magnetic bearings.

The first and second bearings 24, 26 are interdependent of a respective end plate 32. The third bearing 28 is interdependent of a support 50 attached inside the hollow cylinder 30 of the frame.

In the exemplary embodiment of FIG. 1, the third bearing 28 is substantially positioned in the middle of the spacing between the first rotor 16 and the second rotor 20 along the longitudinal axis X. In other words, the third bearing 28 is substantially positioned at a half distance between the first rotor 16 and the second rotor 20 along the longitudinal axis X.

Alternatively, when the shaft 22 comprises two distinct shaft segments interdependent in rotation around the axis of rotation X, the attachment of the two shaft segments is substantially positioned in the middle of the spacing between the first rotor 16 and the second rotor 20 along the longitudinal axis X, and the third bearing 28 is then shifted relatively to the middle of said spacing between the first rotor 16 and the second rotor 20.

Each bearing 24, 26, 28 is a means for supporting the shaft 22, notably able to allow positioning of the rotors 16, 20 along a radial direction perpendicular to the longitudinal axis X.

Additionally, one of the bearings 24, 26, 28 integrates an axial abutment function so as to allow positioning of the rotors 16, 20 along the longitudinal axis X.

During the operation of the electric machine 10, the shaft 22 tends to flex along the radial direction under the effect of the centrifugal force and of the force of gravity, the centrifugal force, in a known way, being an increasing function of the speed of rotation of the machine.

The intermediate bearing 28, laid out according to the invention between both rotors 16, 20 along the longitudinal axis X, then gives the possibility of avoiding excessive deflection of the shaft 22, which allows operation at high speeds of rotation, such as speeds of more than 8,000 revolutions per minute.

The intermediate bearing 28 also gives the possibility of increasing the eigenfrequencies of the shaft 22 and of both rotors 16, 20 which reduce the vibrations of the shaft 22 and of both rotation rotors 16, 20. Indeed, the eigenfrequencies of the shaft 22 and of both rotors 16, 20 then no longer correspond to the exploited range of speeds of rotation, which gives the possibility of avoiding significant resonances in the exploited range of speeds of rotation.

The bulkiness of the electric machine according to the invention is further substantially identical with the bulkiness of the machine of the state of the art, given that the third bearing 28 is laid out between the two existing rotors 16, 20.

The bulkiness of the electric machine according to the invention is on the other hand smaller than that of two electric machines of the state of the art coupled together via a coupling, each electric machine having its own rotor and its own stator laid out inside its own frame.

Both rotors 16, 20 allow improvement in the reliability of the electric machine 10, since in the case of failure of a rotor from among both rotors 16, 20 or in the case of failure of a stator from among both stators 14, 18, the other rotor and the other stator remain operational.

Both rotors 16, 20 also give the possibility of increasing the electric power of the electric machine, while keeping identical bulkiness along the radial direction, perpendicular to the longitudinal axis X, or else give the possibility, for an equivalent electric power, of reducing the bulkiness of the electric machine along the radial direction.

Given that the value of the diameter D of the rotors 16, 20 is limited by the stresses related to the centrifugal force and to the peripheral speed on the one hand, and that the length of each rotor 16, 20 is limited in order to avoid an excessive deflection because of the high speed of rotation, of more than 8,000 revolutions per minute, on the other hand, the electric power of an electric machine rotating at such a speed is relatively limited.

The electric machine 10 according to the invention then gives the possibility of providing a more significant electric power for the aforementioned speeds of rotation and a given value of the diameter D because of the presence of the intermediate bearing 28 limiting the deflection of the shaft 22.

It is thus realized that the electric machine according to the invention is adapted for operating at high speeds of rotation, such as speeds of more than 8,000 revolutions per minute preferably more than 15,000 revolutions per minute and still preferably more than 20,000 revolutions per minute, while keeping the same bulkiness along the radial direction.

Figure 2:
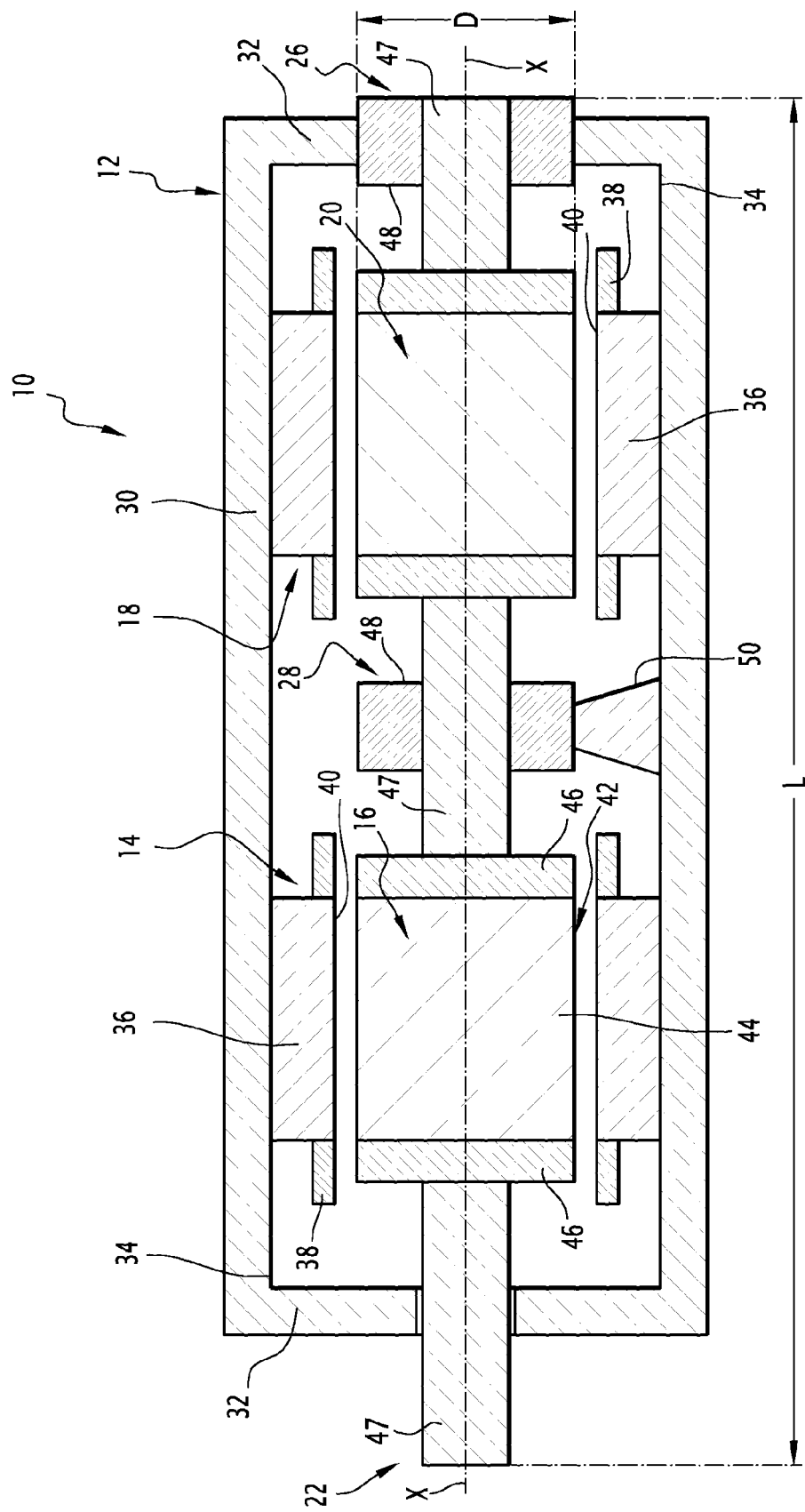
FIG. 2 is a view similar to that of FIG. 1 according to a second embodiment of the invention.

FIG. 2 illustrates a second embodiment of the invention for which the elements similar to the first embodiment, described earlier, are marked with identical references, and are not described again.

According to the second embodiment, the electric machine 10 comprises an end bearing 26 at one single end of the shaft 22 and the intermediate bearing 28. In the exemplary embodiment of FIG. 2, the electric machine 10 exactly comprises two bearings 26, 28.

According to the invention, a single bearing, i.e. the intermediate bearing 28 is laid out between both rotors 16, 20 along the longitudinal axis X. The end bearing 26 is laid out in the vicinity of an end of shaft 22.

The end of the shaft 22 which is not supported by an end bearing, is apart from the respective end plate 32 and is not supported by said end plate 32. The end of shaft 22 which is not supported by an end bearing 32, is intended to be supported by a bearing of another machine able to be coupled with the electric machine 10. The other machine is for example driven by the electric machine 10.

Additionally, a seal gasket, not shown, is laid out between said end of the shaft 22 not supported by an end bearing and the corresponding end plate 32.

The end bearing 26 is interdependent of a respective end plate 32. The intermediate bearing 28 is interdependent of the support 50 attached inside the hollow cylinder 30 of the frame.

Each bearing 26, 28 includes its own casing 48.

The bearing 26, 28 is for example a magnetic bearing, alternatively, the bearing 26, 28 is for example an oil bearing, or a water bearing or a gas bearing or further a roller bearing.

The end bearing 26 is preferably of a type distinct from the intermediate bearing 28. The end bearing 26 is for example a magnetic bearing and the intermediate bearing 28 is an oil bearing. Alternatively, the end bearing 26 is for example an oil bearing and the intermediate bearing 28 is a magnetic bearing.

Alternatively, the end bearing 26 and the intermediate bearing 28 are of the same type. The end bearing 26 and the intermediate bearing 28 are for example magnetic bearings.

The operation of this second embodiment is similar to that of the first embodiment, and is not described again.

The advantages of this second embodiment are similar to those of the first embodiment and are not described again.

It is thus realized that the electric machine according to the invention is adapted for operating at high speeds of rotation, such as speeds of more than 8,000 revolutions per minute, preferably more than 15,000 per minute and still preferably more than 20,000 revolutions per minute while retaining the same bulkiness along the radial direction.

What is claimed is:

1. An electric machine comprising:
   a single frame including only one end bearing and supporting two stators;
   a shaft movable in rotation around an axis of rotation and extending through the frame via a first end plate disposed at one end of the frame and via a second end plate disposed at another end of the frame;
   two rotors disposed within the frame, each rotor being (i) interdependent with the shaft and (ii) corresponding to a respective one of the stators; and
   a single intermediate bearing supported by the frame and disposed between the rotors.

2. The electric machine of claim 1, wherein the one end bearing is adjacent to an end of the frame.

3. The electric machine of claim 1, wherein the intermediate bearing and the one end bearing each includes a corresponding casing.

4. The electric machine of claim 1, wherein the intermediate bearing and the one end bearing is one of a magnetic bearing, an oil bearing, a water bearing, a gas bearing and a roller bearing.

5. The electric machine of claim 1, further comprising a support disposed between the two rotors and attached to the interior of the frame, the support configured to support the intermediate bearing.

6. The electric machine of claim 1, wherein the intermediate bearing is configured to restrict deflection of the shaft between the two rotors.

7. The electric machine of claim 1, wherein the intermediate bearing is configured to restrict vibration of the shaft between the two rotors.

8. The electric machine of claim 1, wherein the intermediate bearing is attached to a support, the support being attached to the frame.

9. The electric machine of claim 1, wherein the shaft is supported by the one end bearing at a first end and by no bearing at a second end.

10. The electric machine of claim 1, wherein the one end bearing is a magnetic bearing and the intermediate bearing is an oil bearing.

11. The electric machine of claim 1, wherein the one end bearing is an oil bearing and the intermediate bearing is a magnetic bearing.

12. The electric machine of claim 1, wherein the one bearing and the intermediate bearing each has a distinct bearing type.

* * * * *